(12) United States Patent
van Baar

(10) Patent No.: US 11,921,492 B2
(45) Date of Patent: Mar. 5, 2024

(54) TRANSFER BETWEEN TASKS IN DIFFERENT DOMAINS

(71) Applicant: Mitsubishi Electric Research Laboratories, Inc., Cambridge, MA (US)

(72) Inventor: Jeroen van Baar, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 203 days.

(21) Appl. No.: 17/216,861

(22) Filed: Mar. 30, 2021

(65) Prior Publication Data
US 2022/0317659 A1    Oct. 6, 2022

(51) Int. Cl.
G05B 19/4155    (2006.01)
B25J 9/16    (2006.01)
(Continued)

(52) U.S. Cl.
CPC ........ G05B 19/4155 (2013.01); B25J 9/1605 (2013.01); B25J 9/161 (2013.01); B25J 9/163 (2013.01); B25J 9/1664 (2013.01); B25J 13/08 (2013.01); B25J 13/088 (2013.01); G05B 2219/40519 (2013.01); G06N 3/08 (2013.01)

(58) Field of Classification Search
CPC ...... G05B 19/4155; G05B 2219/40519; G05B 2219/39298; G05B 2219/40499; B25J 9/1605; B25J 9/161; B25J 9/163; B25J 9/1664; B25J 13/08; B25J 13/088; B25J 9/1656; G06N 3/08
See application file for complete search history.

(56) References Cited

U.S. PATENT DOCUMENTS

2016/0307447 A1* 10/2016 Johnson ............... G08G 5/0069
2021/0004744 A1* 1/2021 Petrany ................ G07C 5/008
2021/0107157 A1* 4/2021 Bai ....................... B25J 9/1692

OTHER PUBLICATIONS

J. Truong, S. Chernova and D. Batra, "Bi-Directional Domain Adaptation for Sim2Real Transfer of Embodied Navigation Agents," in IEEE Robotics and Automation Letters, vol. 6, No. 2, pp. 2634-2641, Apr. 2021, doi: 10.1109/LRA.2021.3062303 (Year: 2021).*

(Continued)

*Primary Examiner* — Adam R Mott
*Assistant Examiner* — Matthew C Gammon
(74) *Attorney, Agent, or Firm* — Gene Vinokur

(57) ABSTRACT

A system for trajectories imitation for robotic manipulators is provided. The system includes an interface configured to receive a plurality of task descriptions, wherein the interface is configured to communicate with a real-world robot, a memory to store computer-executable programs including a robot simulator, a training module and a transfer module, and a processor, in connection with the memory. The processor is configured to perform training using the training module, for the task descriptions on the robot simulator, to produce a plurality of source policy with subgoals for the task descriptions. The processor performs training using the training module, for the task descriptions on the real-world robot, to produce a plurality of target policy with subgoals for the task descriptions, and update the parameters of the transfer module from corresponding trajectories with the subgoals for the robot simulator and real-world robot.

13 Claims, 13 Drawing Sheets

(51) Int. Cl.
*B25J 13/08* (2006.01)
*G06N 3/08* (2023.01)

(56) References Cited

OTHER PUBLICATIONS

J. Truong et al., "Bi-directional Domain Adaptation for Sim2Real Transfer of Embodied Navigation Agents", XP081885301.
F. Golemo et al., "Sim-to-Real Transfer with Neural-Augmented Robot Simulation", XP055903662.
X. Fei et al., "ReLMoGen: Integrating Motion Generation in Reinforcement Learning for Mobile Manipulation", XP055904938.
P. Djurdjevic et al., "Learning Task Decomposition and Exploration Shaping for Reinforcement Learning Agents", XP031447095.

\* cited by examiner

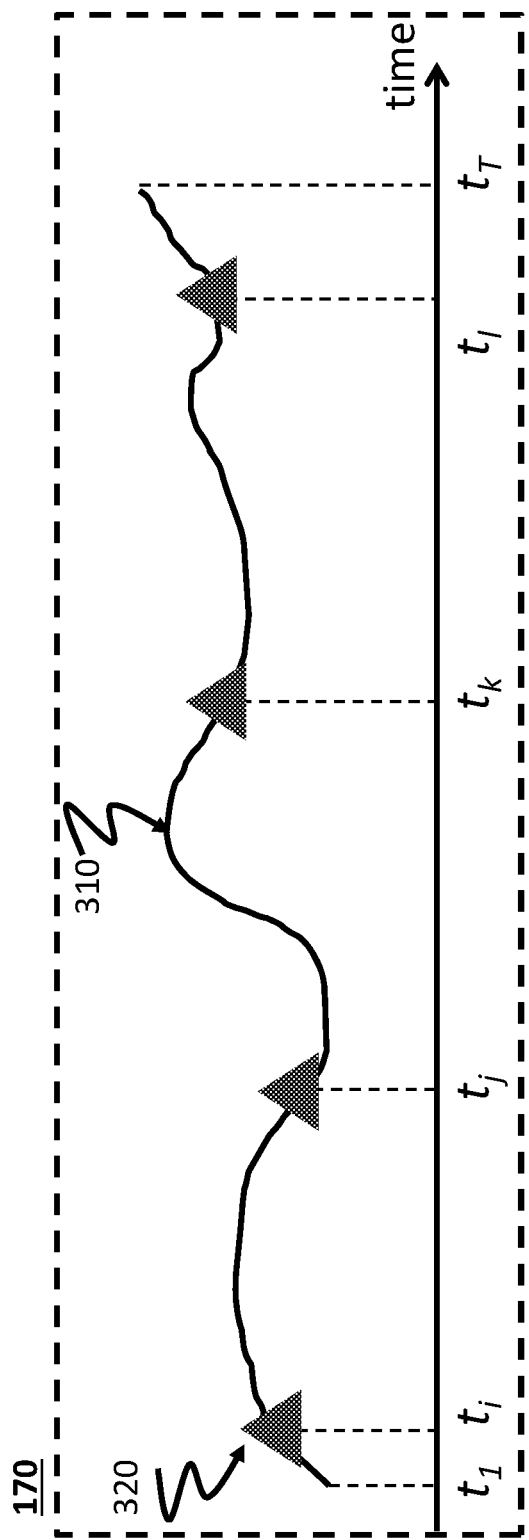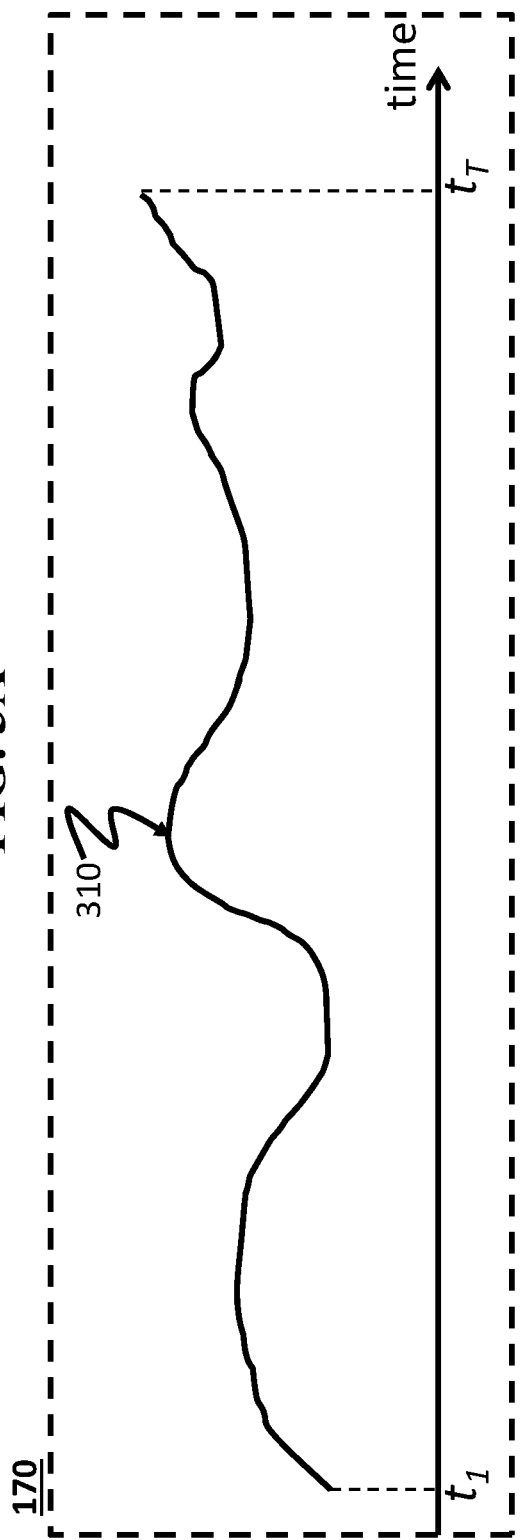
FIG. 3A
FIG. 3B

TRANSFER BETWEEN TASKS IN DIFFERENT DOMAINS

TECHNICAL FIELD

The present invention relates generally to a robot to perform tasks, where the task has been trained in simulation and transferred to the robot, where the transfer has been learned from skills demonstrated in both the simulation and real-world domain.

BACKGROUND

Industrial robots are widely used in a variety of manufacturing operations, including material handling, assembly, inspection, and pick and place processing tasks. Robots need to be programmed in order to perform their tasks correctly. A robot program consists of instructions for an end effector, for example a welding tool, to move to a particular 3D location in some 3D orientation and perform a spot weld. The robot can interpret these instructions to generate a desired trajectory where a robot controller is operating the robot in such a way as to follow that desired trajectory. However, programming a robot requires a person that has been extensively trained. For more complicated tasks the programming can be tedious, and this prohibits more flexibility in the deployment of robots. An alternative to programming the robot is to learn the tasks instead. Robot learning is an active research area. Robots can learn simple tasks, such as pick an object from one location and place it at another location. However, the training time required for even such a simple task is already very long. This requires taking a robot out of production while it is training, which can be costly. Furthermore, there is a risk of damaging the robot during training, especially at the very start of a training session. One way to mitigate this risk is to train a robot in a simulation environment, where the robot and the workspace are simulated by computer graphics and physics engines, and then transfer the results from training to the real robot. Simulations for robotic applications are attractive solutions for training and robotic agents as they provide cost effective data source and alleviate many concerns for example, safety, wear and tear of robot etc. Many state-of-the-art learning approaches rely on robotic simulators for the training process and many times the training is only possible in simulation pertaining to the requirement of large number of samples. Due to the fact that the simulated robot and its environment are approximations to the real world, there is a so-called gap between the simulation and real world. Due to this gap, the results from training in simulation will need to be refined when transferred to the real robot. This refinement, or fine-tuning, itself might take a significant amount of time if the task is complicated.

SUMMARY

Example embodiments described herein provide a solution where the real robot aims to imitate the result from training in simulation, by comparing the desired trajectories for a robot in a simulation environment to the trajectories for a robot in the real robot. The trajectories relate to simple tasks that both the simulated robot and real robot can perform. The comparison of the desired trajectories provides a mechanism to determine a correspondence between the simulation environment and the real world. This determined correspondence can then in turn be utilized to have the robot in the real world imitate the robot in the simulated for new tasks which the robot in the real world has not performed before. This can significantly reduce the time required for the real robot to learn new tasks, and thus reduce damage risk and operating costs. Some embodiments of the present invention are based on a recognition that a system can be provided for trajectories imitation for robotic manipulators. In this case, the system may include an interface configured to receive a plurality of task descriptions, wherein the interface is configured to communicate with a real-world robot; a memory to store computer-executable programs including a robot simulator, a training module and a transfer module; a processor, in connection with the memory, configured to: perform training using the training module, for the task descriptions on the robot simulator, to produce a plurality of source policy with subgoals for the task descriptions; and perform training using the training module, for the task descriptions on the real-world robot, to produce a plurality of target policy with subgoals for the task descriptions; and update parameters of the transfer module from corresponding trajectories with the subgoals for the robot simulator and real-world robot.

Further, according to some embodiments of the present invention, a computer-executable method for trajectories imitation for robotic manipulators can be provided. The computer-executable method is performed, in connection with a processor and a memory storing computer-executable programs including a robot simulator, a training module and a transfer module via an interface. The method includes steps of: receiving a plurality of task descriptions, wherein the receiving is performed to communicate with a real-world robot via an interface; performing training using a training module, for the task descriptions on a robot simulator, to produce a plurality of source policy with subgoals for the task descriptions; performing training using the training module, for the task descriptions on the real-world robot, to produce a plurality of target policy with subgoals for the task descriptions; and updating parameters of the transfer module from corresponding trajectories with the subgoals for the robot simulator and real-world robot.

Yet further, some embodiments of the present invention can provide a computer-executable training method for training a transfer module neural network. In this case, the computer-executable training method include steps of: acquiring a sequence of simulated trajectory data points of a simulated robot; acquiring a sequence of real trajectory data points of a real robot; mapping between the simulated trajectory data points and the simulated trajectory data points, wherein the mapping is repeated for all sequences between the simulated robot trajectory and real the robot trajectory; and storing parameters associated with the learned mapping between the simulated robot trajectory and real robot trajectory for the transfer module neural network.

BRIEF DESCRIPTION OF THE DRAWINGS

The accompanying drawings, which are included to provide a further understanding of the invention, illustrate embodiments of the invention and together with the description explain the principle of the invention.

FIG. 3A depicts a trajectory with subgoals, according to some embodiments of the present invention.

FIG. 3B depicts a trajectory without any subgoals, according to some embodiments of the present invention.

DETAILED DESCRIPTION

Figure 1:
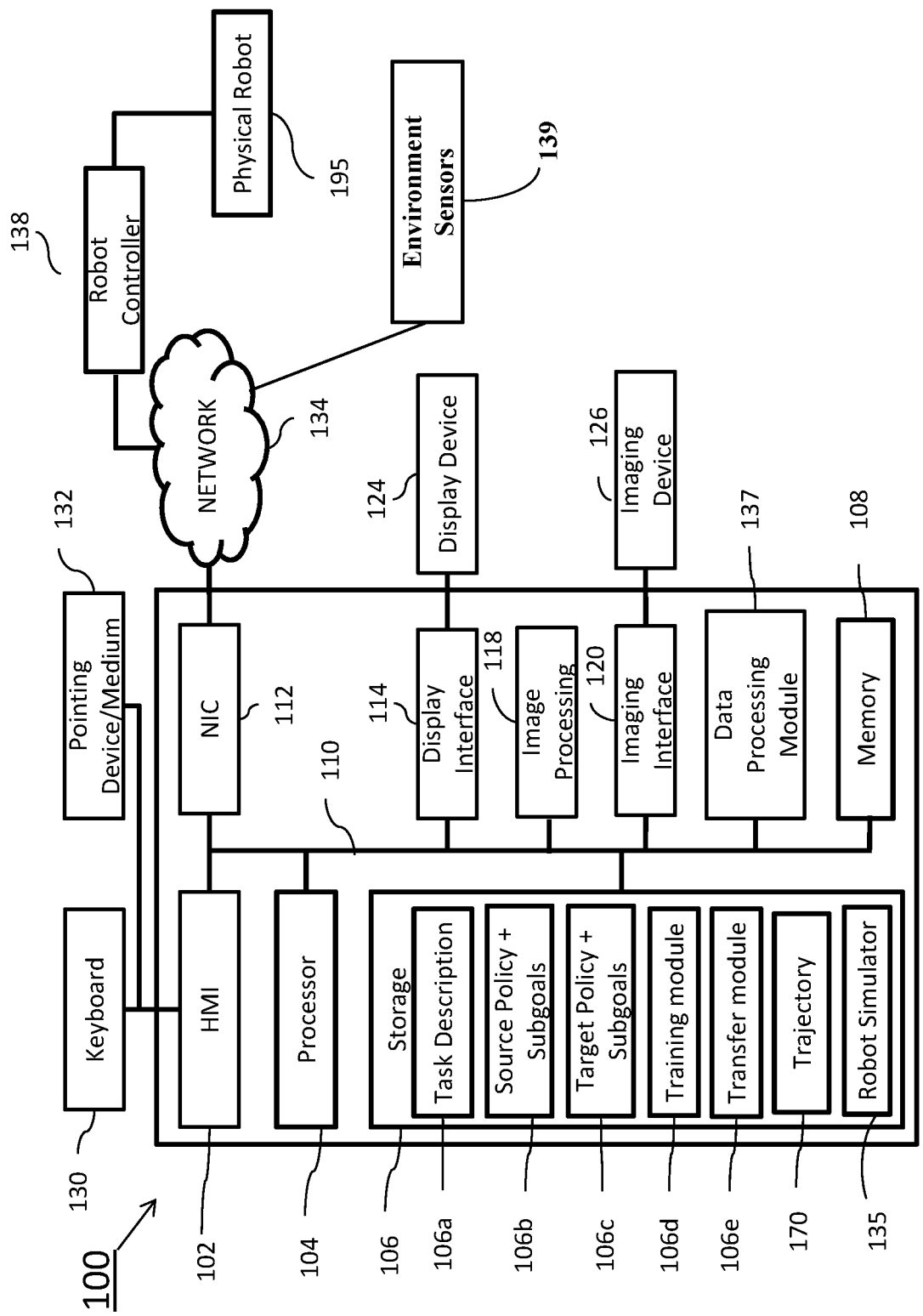
FIG. 1 shows a block diagram of a trajectories imitation system 100 for determining correspondences between trajectories from different environments for the purpose of transferring tasks, according to some embodiments of the present invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1 shows a block diagram of a trajectories imitation system 100 for determining correspondences between trajectories from different environments for the purpose of transferring tasks. The trajectories imitation system 100 is configured to learn parameters of a transfer module which can translate trajectories demonstrated by a simulated robot, where a trajectory pertains to a task, and the translated trajectory is used to perform the task on a real robot. A physical robot 195 system denotes an embodiment of a robot arm in the real world. A robot system may also be denoted as robot arm, robotic manipulator, or simply robot. The classifiers 'real-world' or 'physical' contrast a physical system with a simulation model of the robot. The trajectories imitation system 100 includes a processor 104 configured to execute stored instructions, as well as a memory 108 that stores instructions that are executable by the processor. The processor 104 can be a single core processor, a multi-core processor, a computing cluster, or any number of other configurations. The memory 108 can include random access memory (RAM), read only memory (ROM), flash memory, or any other suitable memory systems. The processor 104 is connected through a bus 110 to one or more input and output devices.

The trajectories imitation system 100 can include a storage device 106 adapted to store task description 106a related to the task for the robot 195 or robot simulator 135 to perform; The storage device 106 can be implemented using a hard drive, an optical drive, a thumb-drive, an array of drives, or any combinations thereof. The storage device 106 further includes a training module 106d. The training module 106d is responsible for learning source policy with subgoals 106b, and target policy with subgoals 106c. The learned source policy with subgoals 106b can be used to make the robot simulator 135 perform the task described by the task description 106a and generate a trajectory 170 while doing so. The learned target policy with subgoals 106c can be used to make the robot 195, by way of the robot controller 138, perform the task described by the task description 106a and generate a trajectory 170 while doing so. The training module 106d is stored as a collection of algorithms, comprised of mathematical formulas, implemented as computer code using a programming language, where the code is interpreted and executed by the processor 104. The storage device 106 further includes a transfer module 106e, stored as a collection of algorithms, comprised of mathematical formulas, implemented as computer code using a programming language, where the code is interpreted and executed by the processor 104. A transfer module 106e can take demonstrated tasks performed by the robot simulator 135 and provided as trajectory 170, and translate them to another trajectory 170 to be performed by the real robot 195. Finally, the storage device 106 includes a robot simulator 135. The robot simulator 135 is stored as a collection of algorithms, comprised of mathematical formulas, implemented as computer code using a programming language, where the code is interpreted and executed by the processor 104.

The task description 106 a contains a description of performing a task with the robot. An example of a task is for the end effector to move from an initial location in 3D space, to another location in 3D space; another example of a task is to open the gripper end effector, go to a location in 3D space, close the gripper to grasp an object, and move to a final location in 3D space. In general a task has a start condition and an end condition, referred to as the task goal. A task is considered complete once the task goal has been obtained. A task can be separated into subtasks. For example if the task is for the robot to move to a 3D location in Cartesian space, and then pick up an object, the task can be decomposed into subtasks: (1) move to a 3D location; and (2) pick up an object. It is understood that more complex tasks can be decomposed into subtasks by a program prior to providing the subtasks as input to the trajectories imitation system 100. If a task is decomposed into subtasks, a task description 106 a can be provided for each subtask. In one embodiment, a task description may be provided by a human operator. In another embodiment, a program is executed to obtain a task description 106 a for the imitation from trajectories system 100. A task description 106 a may also contain constraints for the robot. An example of such a constraint is that the robot cannot move faster than some velocity specified by a human operator. Another example of a constraint is that the robot is prohibited to enter part of the 3D Cartesian workspace, as specified by a human operator. The objective for the robot is to complete the task specified in a task description 106 a as fast as possible, given any constraints in the task description 106 a.

A human machine interface 102 within the trajectories imitation system 100 can connect the system to a keyboard 130 and pointing device 132, wherein the pointing device 132 can include a mouse, trackball, touchpad, joystick, pointing stick, stylus, or touchscreen, among others. The system 100 can be linked through the bus 110 to a display interface 114 adapted to connect the system 100 to a display device 124, wherein the display device 124 can include a computer monitor, camera, television, projector, or mobile device, among others.

The trajectories imitation system 100 includes a data processing module 137 which is connected via the bus 110 to process received robot states and received sensor data from the environment sensors 139. The robot controller 138 controls the motion of the robot to complete a task determined by the task description 106a. In the preferred embodiment the robot controller 138 receives input from the trajectories imitation system 100 and sends commands to the physical robot system 195. In another embodiment the robot controller 138 is incorporated into the robot system 195. In yet another embodiment the robot controller 138 is part of the trajectories imitation system 100.

A network interface controller 112 is adapted to connect the trajectories imitation system 100 through the bus 110 to a network 134. In the preferred embodiment data from the robot controller is received through the network 134 and presented as input to the data processing 137 via the bus 110, for further processing, e.g., by the robot simulator 135. In another embodiment, the robot controller 138 is connected to the trajectories imitation system 100 via a dedicated connection, for example using a data serial cable. In the preferred embodiment one or more environment sensors 139 are connected to the network 134. In another embodiment the sensors may be connected via a dedicated connection, for example using a data serial cable. Environment sensors 139 may include one or more color cameras, an array of position sensors or depth cameras. An example of position sensors are cameras which can track the position of a set of infrared markers attached to an object. It is understood that other sensors or a combination of sensors, may be used. The sensor data may be processed by the data processing 137 in the trajectories imitation system 100. An example of sensor data may be the location of infrared markers in 3D Cartesian space. Another example of sensor data may a point cloud obtained from a depth camera.

Figure 2:
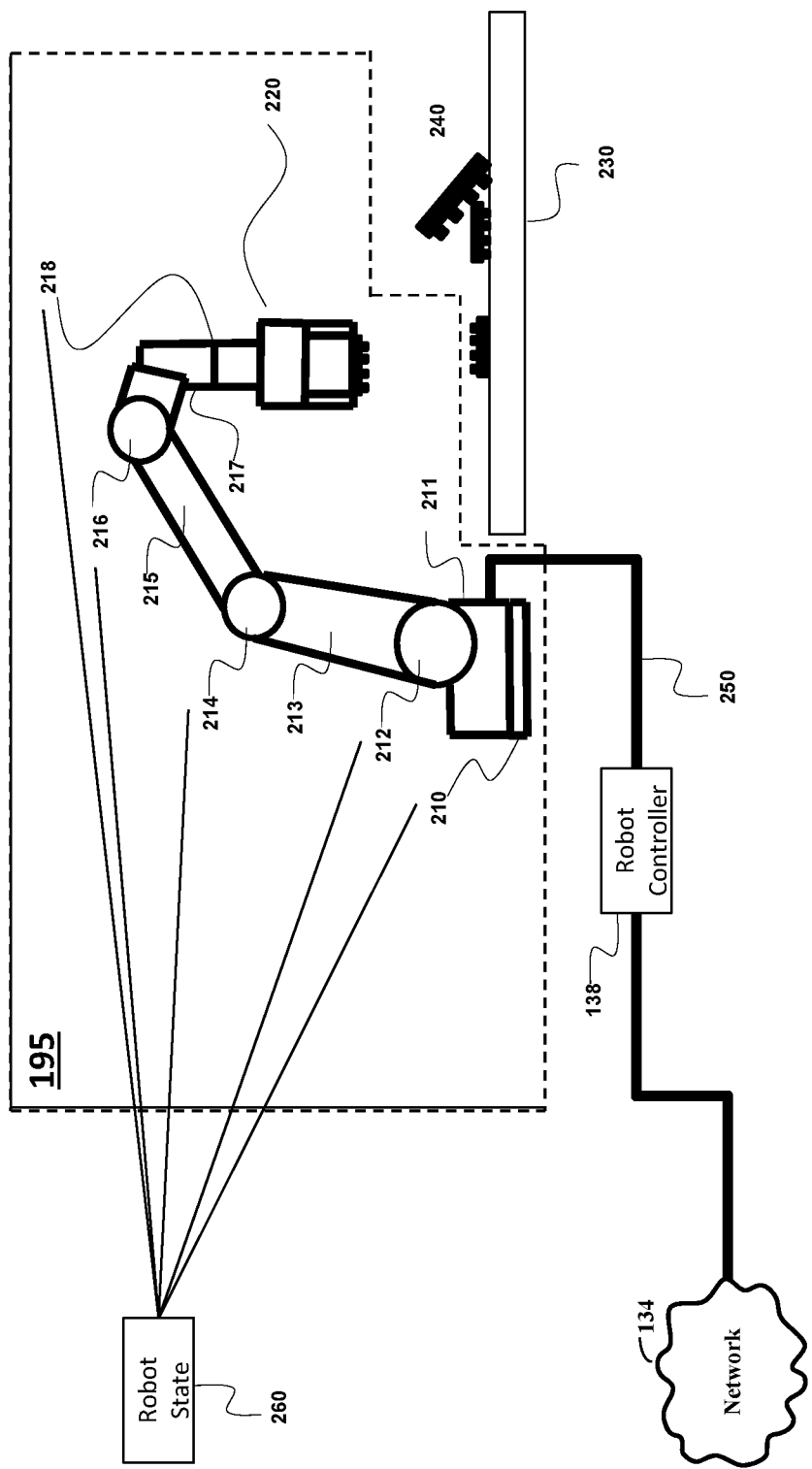
FIG. 2 shows a depiction of a physical robot system, according to some embodiments of the present invention.

FIG. 2 shows a depiction of a physical robot system. In this description a physical robot system 195 is a set of components 211, 213, 215, 217 linked by joints 210, 212, 214, 216, 218. In the described embodiment, the joints 210, 212, 214, 216, 218 are revolutionary joints, but in another embodiment, they can be sliding joints, or other types of joints. The collection of joints determines the degrees of freedom for the robot arm 195. The robot arm 195 has five degrees of freedom, one for each joint 210, 212, 214, 216, 218. In another embodiment the robot may contain six joints. The robot arm 195 has an end effector 220 attached. The end effector 220 is attached to one of its components, typically the last component 217 when the components are considered in a chain. An end effector 220 could be a parallel jaw gripper. A parallel jaw gripper has two parallel fingers whose distance can be adjusted relative to one another. Many other end effectors can be used instead, for example an end effector which contains a welding tip. The joints 210, 212, 214, 216, 218 can be adjusted to achieve desired configurations for the components. A desired configuration may relate to a desired position in Euclidean space, or desired values in joint space. The joints can also be commanded in the temporal domain to achieve desired (angular) velocity and/or (angular) acceleration. The joints have embedded sensors, which can report the state of the joint. The reported state may be the angle, the current, the velocity, the torque, the acceleration or any combination thereof. The reported collection of joint states is referred to as the robot state 260. The commands for the robot are received from the robot controller 138 via connection 250, and the robot state is received by the robot controller 138 via connection 250. In the preferred embodiment the connection 250 is a dedicated data cable. In another embodiment the connection 250 is an ethernet cable. Robots can perform a variety of different tasks. For example, a robot can pick an object to be placed in a bin. Objects 240 are typically presented on some working surface 230. The working surface and objects 240 positions and orientations may be part of the task description 106a.

When we refer to a robot, without the classifications "physical", "real", or "real-world", this could mean a physical robot system 195, or a robot simulator 135 which aims to faithfully simulate the behavior of the physical robot system 195. A robot simulator 135 is a program consisting of a collection of algorithms based on mathematical formulas to simulate a real-world robot's kinematics and dynamics. In the preferred embodiment the robot simulator 135 also simulates the robot controller 138. A robot simulator 135 may generate data for 2D or 3D visualization of the robot, which may be output to the display device 124 via the display interface 114.

A policy represents a directive for the robot to decide what action it should take. A policy can simply be a sequence of actions or states 260 for the robot. A more complicated policy is represented by a function, which takes as input a robot state 260, and provides the robot with an action to take. An action means the values that should be applied to the robot joints 210,212,214,216,218. A policy can be deterministic, meaning that the policy provides a single value for each joint. A policy can also be stochastic, and the policy provides a probability distribution over values for the joints. In the preferred embodiment the policy takes as input a robot state 260 and is represented by a neural network. In another embodiment, the policy can be represented by an analytical function, which takes as input a robot state 260. A policy can be executed for a sequential number of timesteps, which means that for a robot state 260 at some initial timestep to, the policy provides the robot with an action, which is then executed by the robot. The robot will then have arrived in a new robot state 260 at timestep $t_1$. The policy is then executed with that robot state 260 at timestep $t_1$. This repeats for the desired number of timesteps, or the robot receives an indication that the task has been completed. This repeated execution of a policy will result in a trajectory.

FIG. 3A depicts a trajectory with subgoals. A trajectory 170 is associated with a task or subtask that a robot should perform. The trajectory data point 310 is a sequence of values at discrete timesteps in some temporal order. For example the values can be the coordinates of 3D locations in Cartesian space. Another example of values can be vectors of joint angles for each of the robot's joints. Other values such as velocities and acceleration may also be used. The trajectory data points 310 may store a robot state 260 at each discrete timestep. The trajectory 170 is said to have length T, according to some discrete number of timesteps. The start of a trajectory 170 is at timestep $t_1$, and the end of the trajectory 170 is at timestep $t_T$. The trajectory data points 310 are depicted as a continuous line, but the line is in fact a collection of discrete points. The continuous line is merely used for the simplicity of drawing. At various timesteps along the trajectory 170 are subgoals 320. A subgoal 320 is a particular data trajectory point 310 at some discrete timestep t. A subgoal 320 may be stored as a timestep value t. Alternatively, the trajectory data points 310 may contain a subgoal index value. For example, given three subgoals, $s_1$, $s_2$ and $s_3$ stored as integer numbers, the trajectory data points 310 may contain the integer number $s_1$, $s_2$ or $s_3$. In the depiction the four subgoals 320 are stored at timesteps $t_i$, $t_j$, $t_k$, and $t_l$. The timestep locations of the subgoals depend on the task that is associated with the trajectory 170. The subgoals 320 essentially divide the trajectory 170 into a set of sequences of trajectory data points 310. The sequences may have different lengths, determined by the locations of the subgoals 320. For example the sequence between subgoals 320 at timesteps $t_i$ and $t_j$ is of length: $t_j$-$t_i$. A trajectory 170 may not have any subgoals 320 at all.

FIG. 3B depicts a trajectory 170 without any subgoals, and only consist of trajectory data points 310. A trajectory 170 may be generated by a human operator, a software, a robot controller or a policy. It is understood that there could be other mechanisms which generate a trajectory 170.

Subgoals 320 may be stored on the trajectories imitation system 100 as part of the source policy with subgoals 106b and/or target policy with subgoals 106c. In the preferred embodiment the subgoals 320 are generated by a neural network which takes as input trajectories 170 generated from a policy. In the preferred embodiment, the number of subgoals 320 are predetermined by a human operator. In another embodiment the number of subgoals 320 can be learned by analyzing a trajectory 170. An example of analyzing a trajectory is to determine if the values in the trajectory between two subsequent timesteps change more than some threshold, in which case one of the timesteps is considered as a subgoal.

Figure 4:
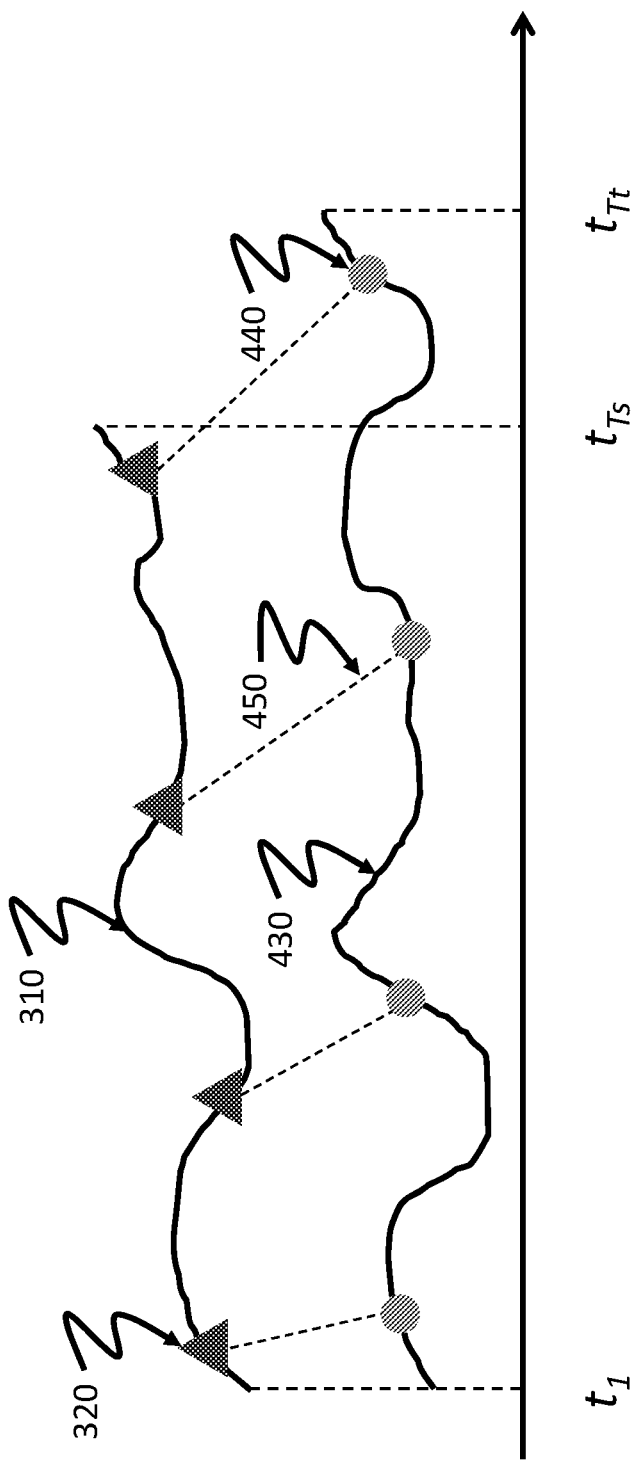
FIG. 4 depicts the correspondence between trajectories via the subgoals, according to some embodiments of the present invention.

FIG. 4 depicts the correspondence between trajectories via the subgoals. Trajectory data points 310 along with subgoals 320 are said to be generated in a source domain. A source domain can for example be the domain of a simulated robot. We may refer to the trajectory 310 in the source domain as the source trajectory. In addition, we refer to policy in the source domain as the source policy. Another trajectory data points 430 along with subgoals 440 are said to be generated in a target domain. A target domain can for example be the domain of a real robot. We may refer to the trajectory 430 in the target domain as the target trajectory. In addition, we refer to policy in the target domain as the target policy. Both trajectories are instances of trajectory 170. The subgoals 320 and 440 in the different domains may occur at different timesteps along each trajectory. In the preferred embodiment, the trajectories 310 and 430 have the same number of subgoals. Since the trajectories 310 and 430 are associated with the same task, the subgoals 320 and 440 provide correspondences 450 between the trajectories. The length of trajectory data points 310 and 430 may be different. For example trajectory data points 310 has length $T_s$ while trajectory data points 430 has length $T_r$.

Figure 5A:
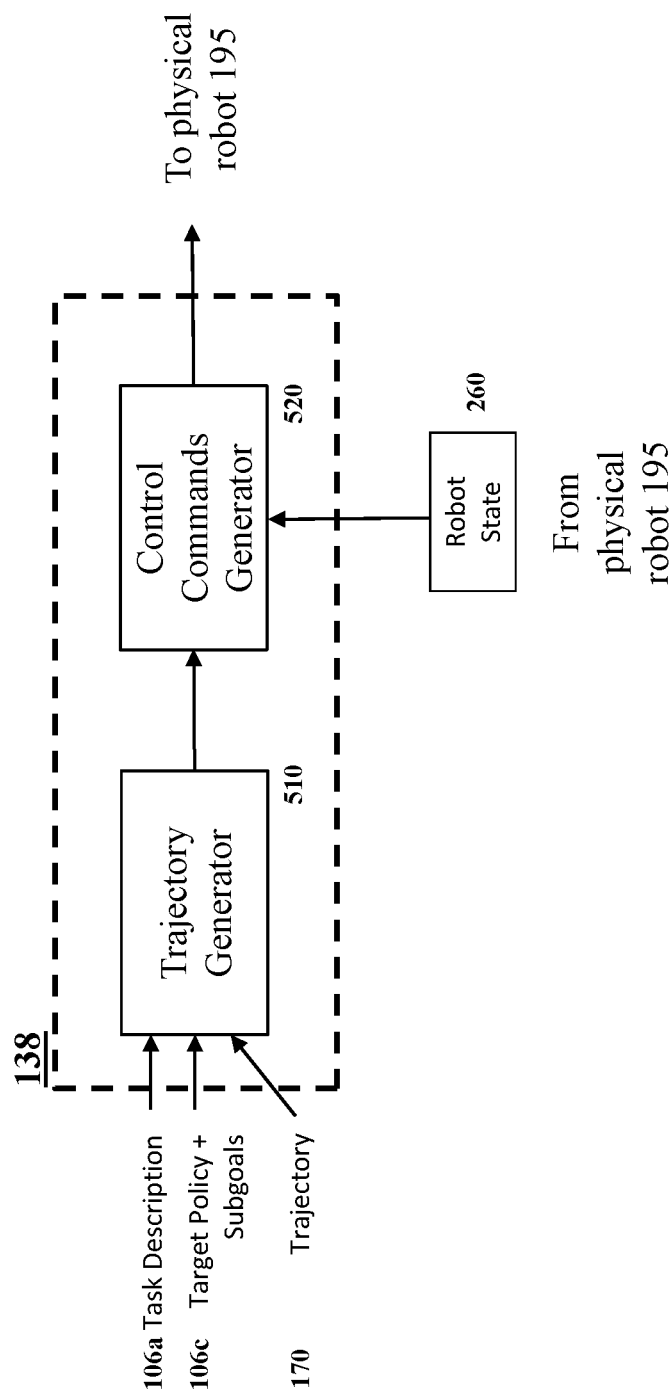
FIG. 5A shows a block diagram of a robot controller, according to some embodiments of the present invention.

FIG. 5A shows a block diagram of a robot controller. In the preferred embodiment the robot controller 138 takes as input a task description 106 a, and a target policy with subgoals 106 c. Alternatively, instead of a target policy with subgoals 106 c, a trajectory 170, consisting of trajectory data points 310 and possible subgoals 320, may be given as input. A trajectory generator 510 generates a desired trajectory for the robot to follow. At time t=T the robot is in some final configuration as determined by the task goal in the task description 106 a. A control commands generator 520 takes as input the generated desired trajectory from the trajectory generator 510 and a robot state 260 and produces commands to send to the physical robot 195. An example of commands generated by the control commands generator 520 are torques to apply to the motors of the robot 195. The control commands generator 520 generates commands for every time step in the generated desired trajectory from the trajectory generator 510. In another embodiment the trajectory generator may be separate from the robot controller 138. For example the trajectory generator may be stored as an executable program in the trajectories imitation system 100.

Figure 5B:
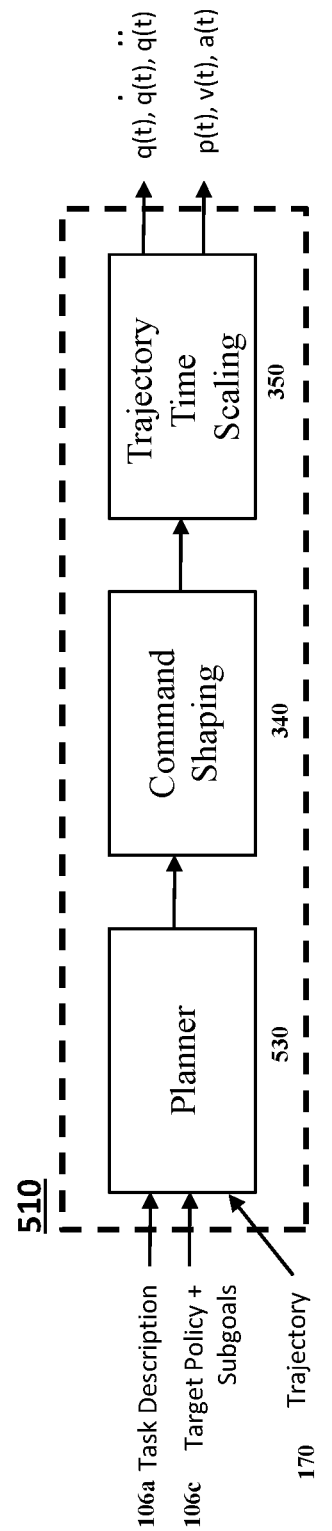
FIG. 5B shows a block diagram of an embodiment of a trajectory generator, according to some embodiments of the present invention.

FIG. 5B shows a block diagram of an embodiment of a trajectory generator 510. A task description 106 a, and target policy with subgoals 106 c are input to a planner 530. A planner 530 is responsible for the initial path, or trajectory. A planner 530 can be a simple linear interpolation between a start and end position. However, a planner 530 can also be more sophisticated and avoid collisions, either with objects in the environment, or with the physical robot 195 itself. The planner 530 generates a path that takes the robot's physical capabilities into account. For example, it avoids paths that would require velocities that exceed the maximum joint velocity. The command shaping 540 considers the output from the planner and transforms the output from the planner 530 in order to satisfy the task goal. The transformed path or trajectory that is output from the command shaping 540 undergoes a trajectory time scaling 550. The trajectory time scaling ensures that the time steps and time intervals in the trajectory are valid for the physical robot 195. In one embodiment the command shaping 540 and trajectory time scaling 550 are interchanged. It is understood that the trajectory generator 510 may have different embodiments. Alternatively, the planner may take as input a task description 106 a and trajectory 170, consisting of trajectory data points 310 and possible subgoals 320. The planner creates its path directly from the input trajectory 170.

The output from the trajectory generator 510 is a desired trajectory of values at discrete timesteps, trajectory data points 310. The output from the trajectory generator 510 may be stored as trajectory 170 in the trajectories imitation system 100. The controller 138 will aim to move the robot in such a way that the desired trajectory is followed as closely as possible. The desired trajectory will be denoted as:

$$q_d(t) \qquad (1)$$

The values at each time step t in $q_d(t)$ can be one or more scalar or vector values. An example of three scalar values at a time step t is (p(t),v(t),a(t)) which comprises of a position, velocity and acceleration in Cartesian space, for example for the end-effector. An example of vector values at a time step t is $(\overline{q}(t), \dot{\overline{q}}(t), \ddot{\overline{q}}(t))$ which denotes the angle, angular velocity and angular acceleration vectors for the joints, respectively. It is understood that different combinations and values can be obtained.

Figure 6:
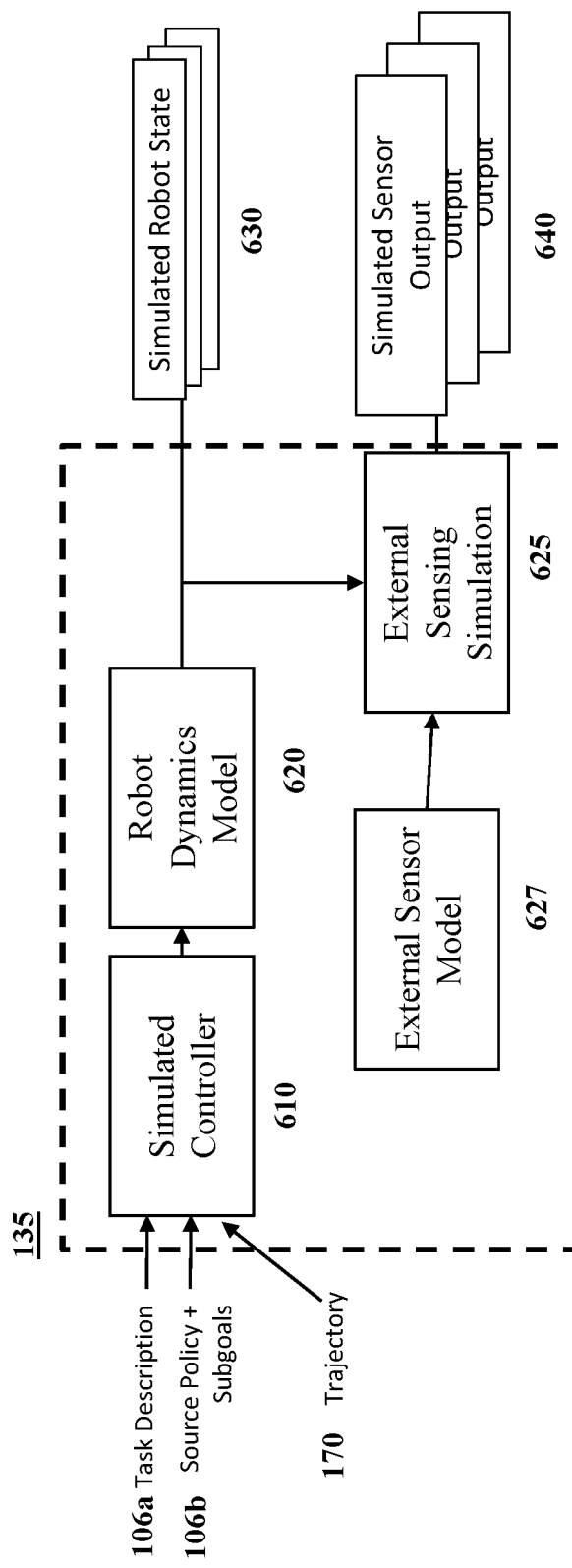
FIG. 6 shows a block diagram of a robot simulator, according to some embodiments of the present invention.

FIG. 6 shows a block diagram of a robot simulator 135. In the preferred embodiment, the robot simulator 135 consists of a simulated controller 610 and robot dynamics model 620. In the preferred embodiment the robot simulator 135 takes as input a task description 106 a, and a source policy with subgoals 106 b. Alternatively, instead of a source policy with subgoals 106 b, a trajectory 170, consisting of trajectory data points 310 and possible subgoals 320, may be given as input. The simulated controller 610 is a program which aims to replicate the behavior of the robot controller 138. The simulated controller 610 produces input for the robot dynamics model. The robot dynamics model 620 is a program based on known formulas and the laws of physics, which aims to replicate the dynamics behavior of the physical robot 195. The robot simulator produces one or more simulator robot states 630. In the preferred embodiment, the simulator robot states 630 contains the same values as the robot states 260. For example, if the robot state 260 stores a vector of joint angles for the robot, the simulated robot state 630 stores a vector of joint angles for the simulated robot. In another embodiment the stored values in the robot state 260 and the simulated robot state 630 are different. The robot simulator 135 furthermore contains an external sensing simulation 625. The external sensing simulation 625 uses the output from the robot dynamics model 620 and an external sensor model 627 to produce simulated sensor output 640. In the preferred embodiment the external sensor model 627 is an RGB camera model and the external sensing simulation 625 is a computer graphics program that creates an image as the simulated sensor output 640 for the simulated robot configuration, derived from the output of the robot dynamics model 620. In another embodiment the external sensor model 627 is a depth camera. It is understood that other external sensor models and algorithm to create simulated sensor output can be used instead. In another embodiment, the robot simulator 135 does not produce simulated sensor output and only generates simulated robot states 630. The collection of simulated robot states 630 may be stored as a trajectory 170.

Figure 7A:
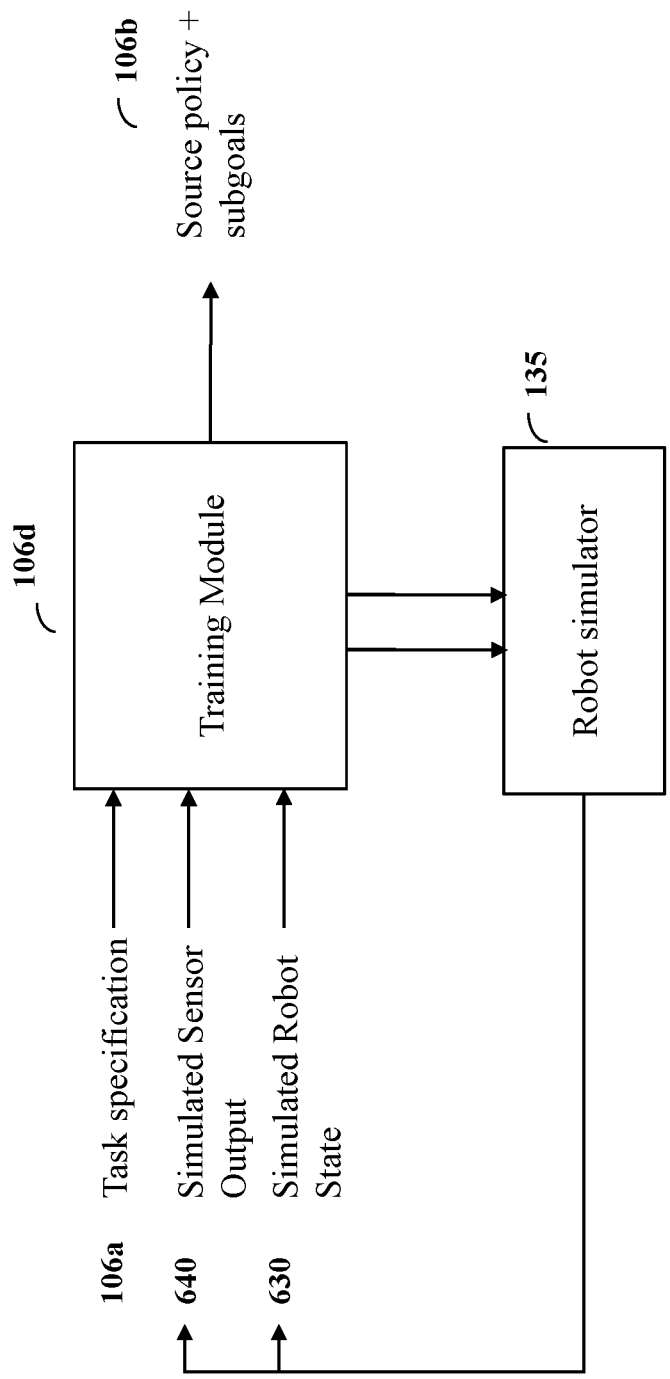
FIG. 7A shows a process flow of the training module for training source policy with subgoals, according to some embodiments of the present invention.

FIG. 7A shows a process flow of the training module 106 d for training source policy with subgoals 106 b. The training module 106 d takes as input a task description 106 a, simulated robot state 630. In the preferred embodiment the training module 106 d also takes as input simulated sensor output 640. The training module processes input and produces updated parameters for a source policy with subgoals 106 b. During the training process, the training module 106 d produces one or more tasks to be executed by the robot simulator 135. In the preferred embodiment the processing of the simulated robot state 630 and simulated sensor output 640 is performed by a neural network. Furthermore, in the preferred embodiment the updated parameters for the source policy with subgoals are determined by another neural network. In another embodiment, the neural network(s) can be replaced with parameterized functions. In yet another embodiment the training module uses lookup tables to store information associated with specific simulated robot states and simulated sensor output. A lookup table is a storage where the storage is indexed by a certain value, e.g., a robot. In the preferred embodiment the training module 106 d uses Reinforcement Learning to determine the weights associated with the neural networks. Reinforcement Learning is an iterative method which aims to learn that given a state, take an action, e.g., move the robot 1 cm to the left, which provides a highest possible reward value. The reward value is a numerical value that is provided to the Reinforcement Learning. An example of Reinforcement Learning is the policy gradient method. The policy gradient method adjusts the policy parameters according to a gradient descent optimization. The training module 106 d utilizes the task description 106 a to determine how much progress has been made towards completion of the task. During the execution of the training, training module 106 d produces input for the robot simulator 135. The training module 106 d completes its execution if a predefined accuracy level of task completion has been reached. For example, the training module 106 d evaluates if the source policy with subgoals results in the robot simulator achieving the task goal for a predefined success rate, measured in percentage. Alternatively, execution of training module 106 d completes if execution has been performed by a predefined amount of time, or a predefined number of execution steps. Updated parameters for the source policy with subgoals are stored during execution of training module 106 d. After the training module 106 d terminates execution, the parameters for the source policy with subgoals 106 b are stored for later usage.

Figure 7B:
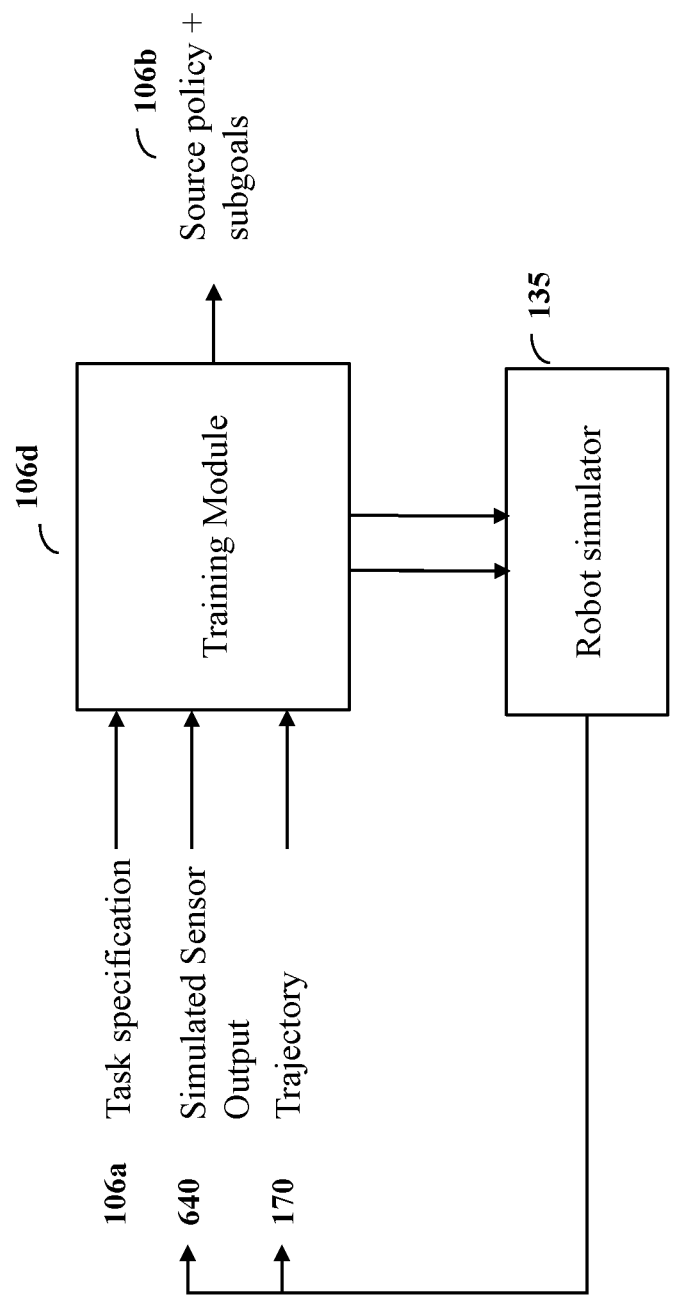
FIG. 7B shows a process flow of the training module for training source policy with subgoals, according to some embodiments of the present invention.

FIG. 7B shows a process flow of the training module 106d for training source policy with subgoals 106b. However, the input to the training module 106d is a trajectory 170 generated by the robot simulator 135.

Figure 7C:
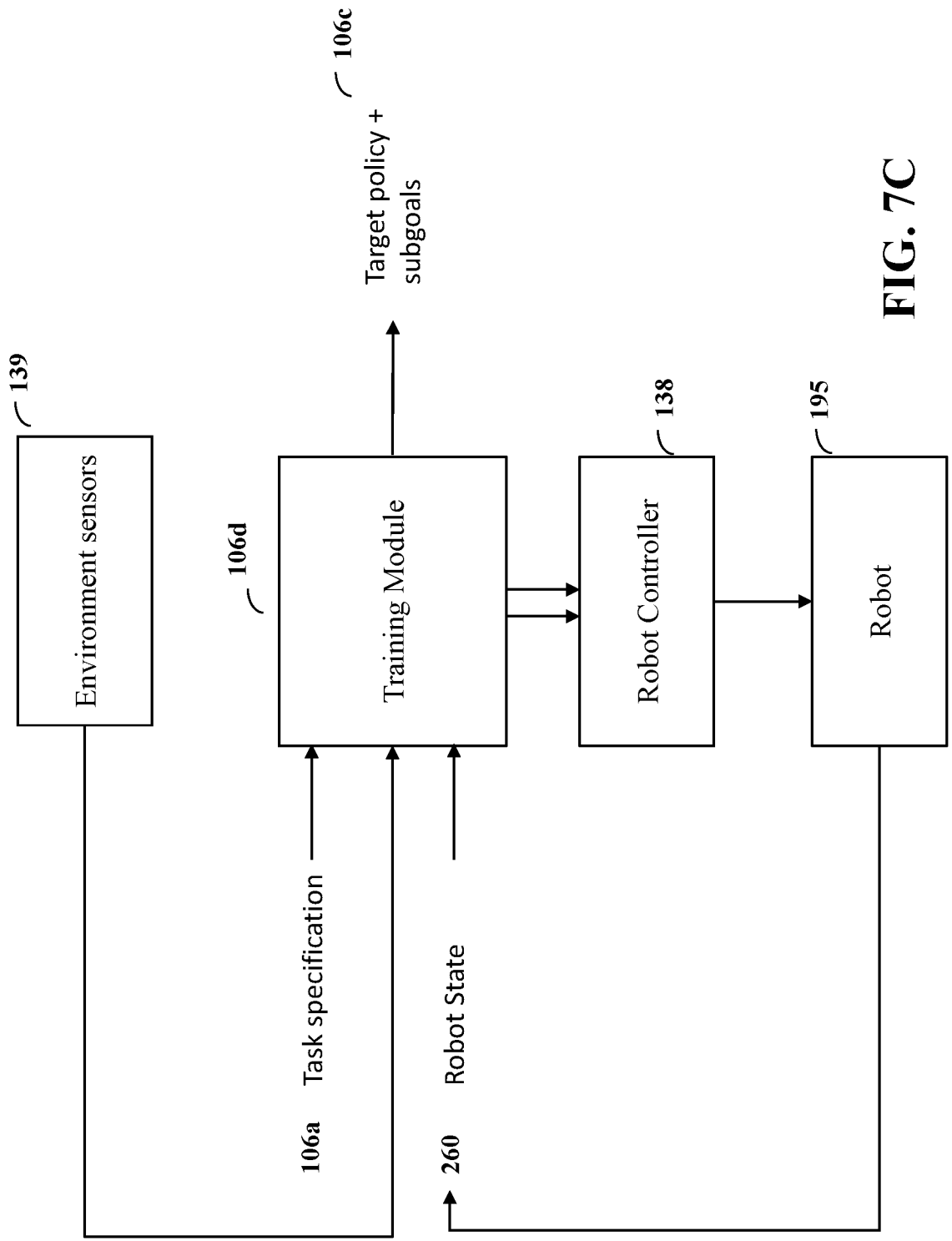
FIG. 7C shows a process flow of the training module for training target policy with subgoals, according to some embodiments of the present invention.

FIG. 7C shows a process flow of the training module 106 d for training target policy with subgoals 106 c. The training module 106 d is the same training module as described above for training the source policy with subgoals 106 b. For training the target policy with subgoals 106 c, the training module 106 d takes as input a task description 106 a, robot state 260. In the preferred embodiment the training module 106 d also takes as input the output from external sensing 139. The training module processes input and produces updated parameters for a target policy with subgoals 106 c. During the training process, the training module produces one or more tasks to be executed by the robot simulator 135. In the preferred embodiment the processing of the robot state 260 and output from the environment sensing 139 is performed by a neural network. Furthermore, in the preferred embodiment the updated parameters for the target policy with subgoals 106 c are determined by another neural network. In another embodiment, the neural network(s) can be replaced with parameterized functions. In yet another embodiment the training module uses lookup tables to store information associated with specific simulated robot states and simulated sensor output. During the execution of the training, training module 106 d produces input for the robot controller 138. The training module 106 d completes its execution if a predefined accuracy level of task completion has been reached. For example, the training module 106 d evaluates if the target policy with subgoals 106 c results in the robot simulator achieving the task goal for a predefined success rate, measured in percentage. Alternatively, execution of training module 106 d completes if execution has been performed by a predefined amount of time, or a predefined number of execution steps. Updated parameters for the target policy with subgoals 106 c are stored during execution of training module 106 d. After the training module 106 d terminates execution, the parameters for the target policy with subgoals 106 c are stored for later usage.

Figure 7D:
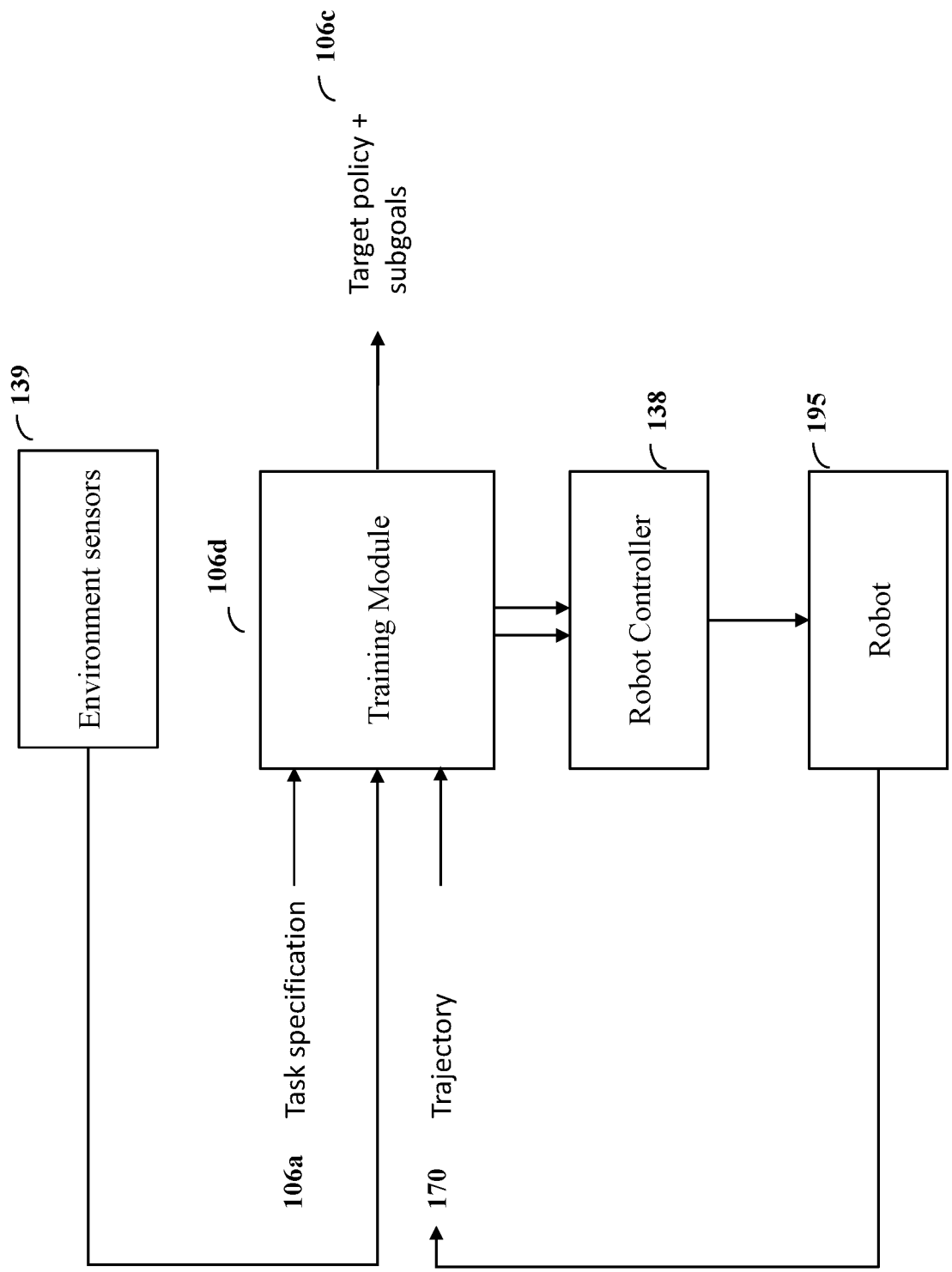
FIG. 7D shows a process flow of the training module for training target policy with subgoals, according to some embodiments of the present invention.

FIG. 7D shows a process flow of the training module 106d for training target policy with subgoals 106c. However, the input to the training module 106d is a trajectory generated by the robot controller 138 and robot 195.

The training module 106d is executed for the simulated robot and the real robot using the same tasks, as determined by task description 106a. The training module 106d is executed on n different tasks, for both the robot simulator 135 to produce source policy with subgoals 106b, as well as for the robot 195 to produce target policy with subgoals 106c. For each task, a policy with subgoals is stored. Therefore, for n different tasks, each specified as task description 106a, a total of n policies with associated subgoals will have been trained and stored. For the real robot the system 100 stores $n_{real}$ target policies with subgoals 106c, whereas for the simulated robot the system stores $n_{sim}$ source policies with subgoals 106b.

Figure 8:
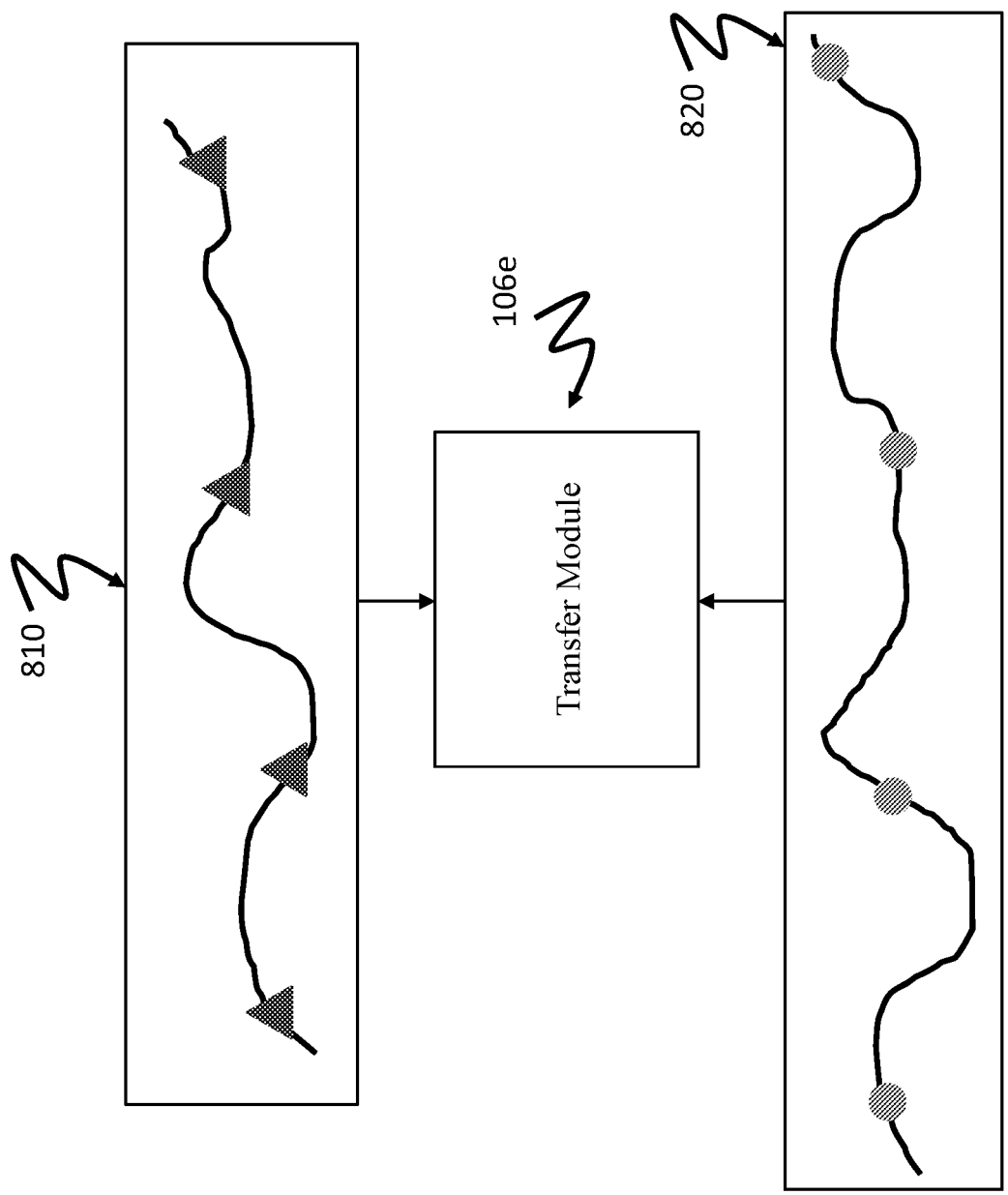
FIG. 8 depicts the training for a transfer module, according to some embodiments of the present invention.

FIG. 8 depicts the training for a transfer module. A transfer module 106e aims to learn a correspondence between a trajectory generated by a source policy with subgoals 106b and a trajectory generated by a target policy with subgoals. In the preferred embodiment the source policy with subgoals 106b is associated with a robot simulator, whereas the target policy with subgoals 106c is associated with a real-world robot. We define $n=n_{real}=n_{sim}$. For index i, where i is in the set $\{1, \ldots, n\}$, using the i-th source policy with subgoals and robot simulator 135, a source trajectory with subgoals 810 is generated. Trajectory 810 is of form 170. For the same index i, using the i-th target policy with subgoals and robot controller 138 and robot 195, a target trajectory with subgoals 820 is generated. The target trajectory with the subgoals 820 is of form 170. The transfer module 106e learns a correspondence between the simulated robot trajectory and the real robot trajectory. In the preferred embodiment this learning is performed using a neural network (a transfer module neural network). The neural network takes as input a sequence of values, i.e., trajectory data points, between two subgoals in both the simulated robot trajectory 810, and the real robot trajectory 820. The neural network then learns a mapping between these sequences. The learning of this mapping is repeated for all the sequences between the subgoals in the simulated robot trajectory 810 and real robot trajectory 820. In another embodiment, the mapping may be learned as a Markov Decision Process homomorphism, which is a mapping between corresponding structure in two Markov Decision Processes. It is understood that other embodiments may use a different learning method. The learning of the mapping may be repeated several times using the i-th policy. Furthermore, the training of the transfer module 106e is repeated for all n source and target policies with subgoals. After a desired termination criteria is met, the training for the transfer module stops and the parameters associated with the learned mapping between the simulated robot and real robot for the transfer module 106e are stored. A desired termination criteria could be a desired duration, or a desired number of execution steps. Another termination criteria may be determined from the accuracy of the learned mapping for transfer module 106e.

Figure 9:
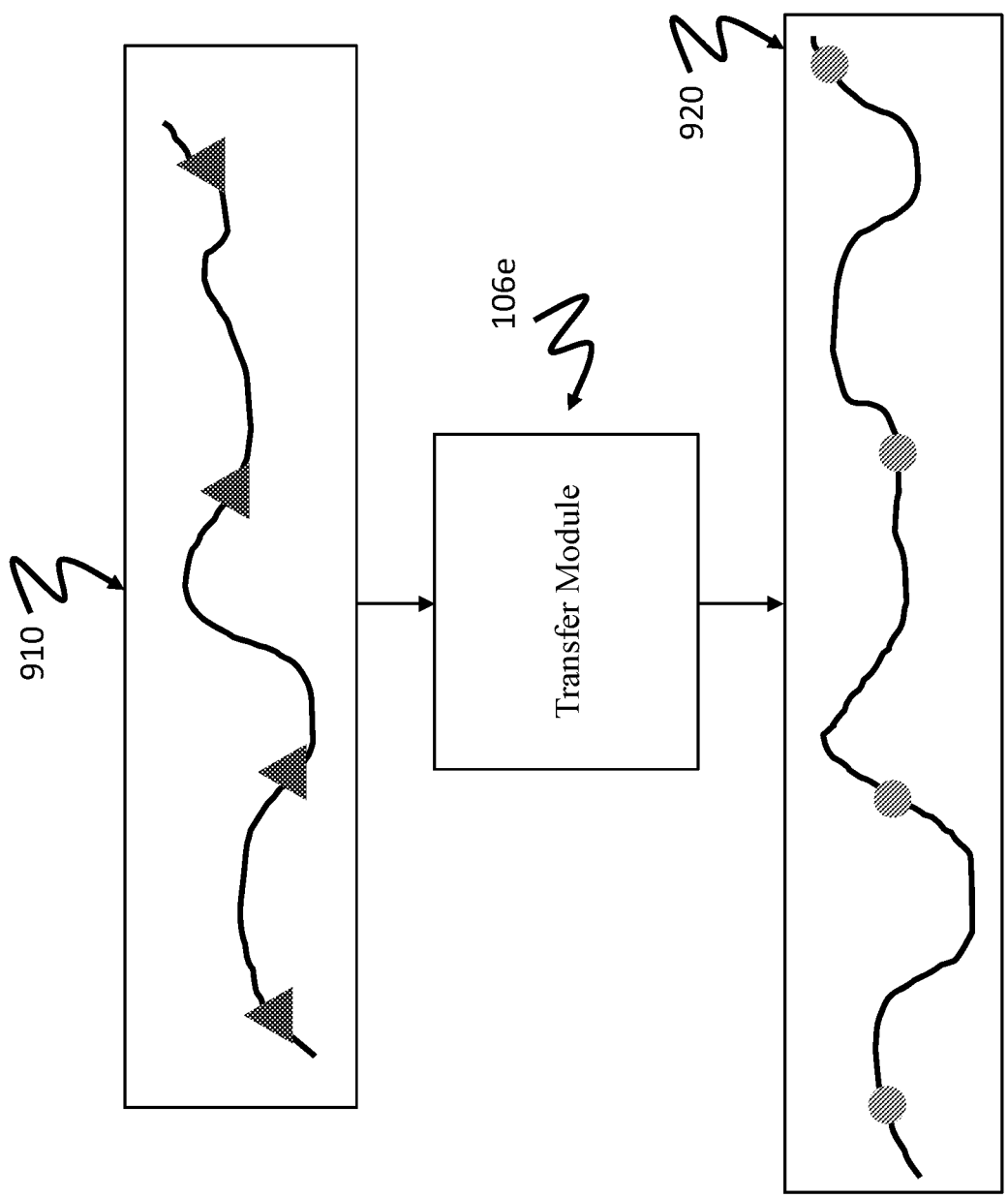
FIG. 9 depicts using the transfer module to generate a trajectory from a trajectory associated with a new task, according to some embodiments of the present invention.

FIG. 9 depicts using the transfer module to generate a trajectory 920 from a trajectory 910 associated with a new task. A new task, specified by a task description 106 a, is first trained using the robot simulator using training module 106 d, to store a source policy with subgoals 106 b for the new task. The source policy with subgoals 106 b for the new task and the robot simulator are used to produce trajectory 910. Trajectory 910 is of the form 170. The transfer module 106 e is then used to transform trajectory 910 to produce trajectory 920. Trajectory 920 is of the form 170. In another embodiment the trajectory 910 and trajectory 920 do not contain any subgoals.

Since the transfer module 106e was trained on trajectories associated with source and target policies with subgoals, and source policy with subgoals 106b is associated with the robot simulator, and the target policy with subgoals 106c are associated with the real robot 195, the trajectory 920 is a trajectory for the real robot 195. Trajectory 920 may thus be used to execute the new task on the real robot. Trajectory 920 can be input to the robot controller 138. Alternatively, the learning module 106d may learn a target policy with subgoals 106c from the trajectory 920 for the new task. The learned target policy with subgoals 106c is then executed to perform the new task on the real robot.

For a new task, a trained source policy with subgoals 106b may produce more than one trajectory 910. Each such trajectory 910 is transformed to produce a corresponding trajectory 920. The learning module 106d may learn a target policy with subgoals 106c from the plurality of trajectories 920.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

I claim:

1. A system for trajectories imitation for robotic manipulators, comprising:
   an interface configured to receive a plurality of task description, wherein the interface is configured to communicate with a real-world robot;
   a memory to store computer-executable programs including a robot simulator, a training module and a transfer module, wherein the transfer module is configured to transfer simulation trajectories of the robot simulator to real trajectories for the real-world robot;
   a processor, in connection with the memory, configured to:
      perform training using the training module, for the task description on the robot simulator, to produce a source policy associated with the robot simulator;
      perform training using the training module, for the task description on the real-world robot, to produce a target policy associated with the real-world robot;
      obtain a simulated robot trajectory generated from the source policy and a real robot trajectory generated from the target policy, wherein the simulated robot trajectory is defined by a plurality of first trajectory data points and the real robot trajectory is defined by a plurality of second trajectory data points;
      determine a correspondence between the simulated robot trajectory and the real robot trajectory as a mapping between i.) a sequence of points of the plurality of first trajectory data points between a pair of subgoals on the simulated robot trajectory and ii.) a sequence of points of the plurality of second trajectory data points between a pair of subgoals on the real robot trajectory; and
      update parameters of the transfer module from the correspondence between the simulated robot trajectory and the real robot trajectory to train the transfer module, wherein the transfer module is represented by a neural network, and the training of the transfer module updates parameters of the neural network.

2. The system of claim 1, wherein the source trajectory is associated with the task description.

3. The system of claim 1, wherein the transfer module with updated parameters takes a source trajectory as input and produces a target trajectory as output.

4. The system of claim 1, wherein the training module takes as input data from environment sensors.

5. The system of claim 4, wherein the environment sensors are one or more color cameras.

6. The system of claim 5, wherein the environment sensors are an array of position sensors.

7. The system of claim 1, wherein the robot simulator produces simulated sensor output.

8. The system of claim 7, wherein the simulated sensor output is generated using external sensing simulation, which takes as input a simulated robot state.

9. The system of claim 1, wherein the real-world robot is a robotic manipulator of the robotic manipulators, controlled by a robot controller, and wherein the robotic manipulator produces a plurality of robot states when performing a task.

10. The system of claim 1, wherein the robot controller is stored in memory as a computer-executable program.

11. The system of claim 1, wherein the robot simulator produces a plurality of robot states when performing a task according to the task description.

12. The system of claim 11, wherein said robot simulator comprises a simulated controller and a robot dynamics model, configured to produce one or more simulated robot states.

13. A computer-executable method for trajectories imitation for robotic manipulators, in connection via an interface with a processor and a memory storing computer-executable programs including a robot simulator, a training module and a transfer module, wherein the transfer module is configured to transfer simulation trajectories of the robot simulator to real trajectories for the real-world robot, the method comprising steps of:

receiving a task description to communicate with a real-world robot via the interface;

performing training using the training module, for the task description on the robot simulator, to produce a source policy associated with the robot simulator;

performing training using the training module, for the task description on the real-world robot, to produce a target policy associated with the real-world robot;

obtaining a simulated robot trajectory generated from the source policy and a real robot trajectory generated from the target policy, wherein the simulated robot trajectory is defined by a plurality of first trajectory data points and the real robot trajectory is defined by a plurality of second trajectory data points;

determining a correspondence between the simulated robot trajectory and the real robot trajectory as a mapping between i.) a sequence of points of the plurality of first trajectory data points between a pair of subgoals on the simulated robot trajectory and ii.) a sequence of points of the plurality of second trajectory data points between a pair of subgoals on the real robot trajectory; and updating parameters of the transfer module from the correspondence between the simulated robot trajectory and the real robot trajectory to train the transfer module, wherein the transfer module is represented by a neural network, and the training of the transfer module updates the parameters of the neural network.

* * * * *